UNITED STATES PATENT OFFICE.

CHRISTIAN DANTSIZEN, OF SCHENECTADY, NEW YORK, ASSIGNOR TO GENERAL ELECTRIC COMPANY, A CORPORATION OF NEW YORK.

PORCELAIN.

1,343,040.   Specification of Letters Patent.   Patented June 8, 1920.

No Drawing.   Application filed December 3, 1918. Serial No. 265,160.

*To all whom it may concern:*

Be it known that I, CHRISTIAN DANTSIZEN, a citizen of the United States, residing at Schenectady, in the county of Schenectady, State of New York, have invented certain new and useful Improvements in Porcelain, of which the following is a specification.

The present invention relates to the manufacture of refractory compositions of the nature of porcelain and it is the object of the invention to improve the mechanical and electrical insulating properties of these materials.

Porcelain has heretofore been made of a mixture of clay, a flux, such as feldspar, and silica, these ingredients varying somewhat in proportion and chemical purity. The silica has been used as a sort of refractory skeleton or body during the vitrification of the other ingredients.

I have discovered that the mechanical and insulating properties of porcelain may be improved by using in place of silica, in part or entirely, a stable refractory material, such, for example, as an oxid of zirconium, titanium, aluminum, magnesium, beryllium, or thorium.

In the manufacture of porcelain various formulæ are employed but these differ in the main in the proportions of the clay, feldspar and silica, and in the character of the clay. Manufacturing processes differ in the treatment given the materials constituting the porcelain body preliminary to molding or otherwise shaping, and also to some extent in the nature of the firing, for example, whether under oxidizing or reducing conditions. The temperature at which the firing of porcelain is carried out also varies according to the results desired. All these variations are well known to makers of porcelain, or similar ceramic ware, but my invention is not concerned with these variations. The refractory material constituting my invention differs from the porcelain heretofore produced in the substitution of a refractory metallic oxid for silica either entirely or in part.

When only part of the silica of a porcelain mixture is replaced by a refractory metallic oxid an improvement in the electrical and mechanical property of porcelain is obtained, depending on the amount of displacement of silica by refractory metallic oxid. Among the various refractory oxids which I have used in porcelain with the greatest improvement in its properties are the oxids of titanium and zirconium. It is not necessary that all the silica in the porcelain be replaced by a chemically pure refractory metallic oxid. For example, instead of zirconia in a pure state, zircite cement can be used in porcelain mixtures with improved results.

Zircite cement contains about 81% zirconia ($ZrO_2$) and about 14% of silica, together with some small amounts of other materials such as oxids of titanium, aluminum and iron. When using zircite cement it is advantageous also to add a small proportion of alumina to the porcelain body.

A typical porcelain mixture in a "green" state before firing, may consist of 45 parts clay, 35 parts feldspar, and 15 parts flint. When a porcelain having the above composition and prepared in the usual manner is heated to 800° C., and then plunged into water it becomes highly fragile so that it can be readily broken apart between the fingers. When the silica in such a composition is replaced by a refractory metallic oxid, for example, zirconia, or zircite cement, the finished porcelain can be heated to 800° C. and can be plunged into water without losing its mechanical strength. The modulus of rupture of a sample of porcelain was found to be 4390, the modulus of rupture of a zirconia porcelain similarly prepared was found to be 7400. The electrical resistance of ordinary porcelain and zirconia porcelain are closely the same at ordinary temperatures but at elevated temperatures the electrical resistance of zirconia porcelain is greater than that of ordinary porcelain; for example, at 286° C. the electrical resistance of ordinary porcelain was found to be .832 megohms while at this temperature the resistance of zirconia porcelain is 2.43 megohms. The new porcelains embodying my invention are also less porous than silica porcelain.

Silica not only occurs in a variety of forms, for example, alpha quartz, beta quartz, alpha, beta, and $beta_2$ tridymite, cristobalite, and quartz glass, but is converted from one modification into another by a temperature change. The gradual conversion of a form of silica stable at high temperature to a form stable at a lower temperature will account for an increase in the porosity of silica porcelain as these different allotropic modifications differ in specific gravity.

In my opinion the improvements in the mechanical and electrical properties of my improved porcelain over ordinary silica porcelain is to be ascribed to the stability of the refractory metallic oxids.

What I claim as new and desire to secure by Letters Patent of the United States, is:

1. A porcelain containing in place of part at least of the usual free silica content a refractory metallic oxid.

2. A porcelain containing uncombined refractory metallic oxid in substantial proportion.

3. An unfired porcelain body comprising clay, feldspar, and a refractory metallic oxid.

4. A porcelain obtained by firing a mixture of clay, feldspar and zirconia.

5. A refractory composition comprising clay, zirconium oxid and a fluxing material, the combined proportion of clay and zirconium oxid largely exceeding the proportion of fluxing material.

6. A porcelain containing zirconium oxid.

7. An electrical insulator comprising porcelain containing a refractory metallic oxid.

8. An electrical insulator comprising porcelain containing zirconia.

9. A porcelain composition comprising about 45 parts of clay, about 35 parts of feldspar and a substantial proportion of a refractory metallic oxid.

10. An unfired porcelain composition comprising by weight about 45 parts of clay, about 35 parts of feldspar and about 15 parts of zirconia, said composition being capable of being converted by firing to a porcelain insensitive to sudden temperature changes, having a materially higher modulus of rupture and greater electrical resistance at higher temperature than silica porcelain.

In witness whereof I have hereunto set my hand this 2nd day of December, 1918.

CHRISTIAN DANTSIZEN.